United States Patent [19]
Wagner et al.

[11] Patent Number: 6,148,985
[45] Date of Patent: Nov. 21, 2000

[54] SAFETY DEVICE ON METAL-FORMING MACHINE TOOLS

[75] Inventors: Ingo Wagner, Dorfhain; Horst Wolf, Pretzschendorf, both of Germany

[73] Assignee: Telegaertner Geraetebau GmbH, Hoeckendorf, Germany

[21] Appl. No.: 09/269,958

[22] PCT Filed: Oct. 4, 1997

[86] PCT No.: PCT/DE97/02289

§ 371 Date: Jun. 3, 1999

§ 102(e) Date: Jun. 3, 1999

[87] PCT Pub. No.: WO98/16371

PCT Pub. Date: Apr. 23, 1998

[30] Foreign Application Priority Data

Oct. 12, 1996 [DE] Germany ............................ 196 42 204

[51] Int. Cl.[7] .................................................. F16H 15/38
[52] U.S. Cl. ............................................ 192/130; 192/133
[58] Field of Search ................................ 192/130, 133, 192/134; 100/53

[56] References Cited

U.S. PATENT DOCUMENTS

| | | |
|---|---|---|
| 3,783,662 | 1/1974 | Keller et al. . |
| 3,866,004 | 2/1975 | Nawrocki ............................ 192/134 X |
| 4,044,445 | 8/1977 | Douri ................................. 192/134 X |
| 4,060,160 | 11/1977 | Lieber ................................ 192/134 X |
| 4,279,335 | 7/1981 | Plumb ..................................... 192/134 |
| 4,453,455 | 6/1984 | Bergstrand . |
| 5,560,466 | 10/1996 | Folk et al. .......................... 192/134 X |
| 5,622,076 | 4/1997 | Welty ................................ 192/134 X |

FOREIGN PATENT DOCUMENTS

| | | |
|---|---|---|
| 0752307 | 1/1997 | European Pat. Off. . |
| 1333415 | 12/1963 | France . |
| 949919 | 9/1956 | Germany . |
| 3213491 | 7/1983 | Germany . |
| 2070512 | 9/1981 | United Kingdom . |
| 2177957 | 2/1987 | United Kingdom . |

Primary Examiner—Charles A Marmor
Assistant Examiner—Sául Rodríguez
Attorney, Agent, or Firm—Jordan and Hamburg LLP

[57] ABSTRACT

The invention concerns a safety device on metal-forming machine tools, in particular on pneumatic pressing machines, used in the execution of short-stroke pressing processes, for preventing intervention in the danger zone during the tool working movement and unintentional closure movements. The machine essentially comprises a machine housing, a power-generating system, a control system and a tool arrangement with a fixed part and a movable part, and the actual metal-forming tool connected thereto. The object of the invention is the highly reliable prevention of injuries owing to inattentiveness in spite of hands' being left in the immediate danger zone. To that end, the safety device (8) consists of a lever-like part (9) which is disposed between a guide part (15) and a counter bearing (14), is connected both to the power-generating system (2) and to the movable part (4) of the tool (3), slides along the guide part (15) and co-operates with the counter bearing (14) such that each working stroke of the movable part (4) occurs in two stages, first as a stroke for moving into a predetermined position (20) and then as a power stroke for carrying out the forming process, which occurs only when there is no obstacle (25) in the space between the movable part (4) and the workpiece.

41 Claims, 5 Drawing Sheets

SAFETY DEVICE ON METAL-FORMING MACHINE TOOLS

BACKGROUND OF THE INVENTION

The invention relates to a safety device on metal-forming machines, in particular on pneumatic press machines where short-stroke press operations are performed, for preventing intervention in a danger area during a working motion of a tool and for preventing unintentional closing motions when using workpieces. The machine includes a machine housing, a power-generating device, a control and a tool arrangement having a fixed part and a movable part and the actual metal-forming tool connected thereto.

The EC machine guideline stipulates which rules and standards are to be observed in order to achieve safety at work to the greatest possible extent, for example on press machines. Accordingly, hand protection can be achieved in particular by only safe tools being used, by the danger point being shielded and by two-hand controls or contactless protective devices, e.g. light barriers, being used.

Such safety devices are known in a multiplicity of embodiments and are accurately matched to the respective conditions of use. However, it has been found that these safety devices cannot always be used or can only be used with a certain residual risk.

Thus, for example in the manufacture of plug-in connectors fitted with cables, i.e. during the securing of cables in plug-in connectors, it is conventional practice to connect the outer and/or inner conductors to one another by a crimping operation. A crimping tool, which can be operated by hand and therefore involves little risk of injury, is useful for this in the case of smaller cable cross sections. Nonetheless, crimping by hand is harmful, especially when this operation has to be repeated continually.

Pneumatic presses are therefore also used for the connecting of electric cables or lines having a relatively small cross section in order to make the work easier for the assembly workers.

Known safety devices with two-hand control cannot be used here, since, to produce the connections, both hands are required even during the press operation in order to hold the connecting elements in position. That is to say, the operator of such a press, before the friction grip is produced and while the friction grip is being produced, must hold the parts of the plug-in connector in position with one hand and the inserted cable with the other hand, since otherwise the electrical and also the mechanical connection between cable and connector will be effected in such a way that it is either faulty or damaged. At worst, terminal parts may be destroyed.

Electric and electronic safety devices are often susceptible to faults and do not always provide onehundred per cent safety.

SUMMARY OF THE INVENTION

The object of the invention is therefore to provide a safety device having a previously known purpose which is based essentially on mechanical principles and which, despite the hands remaining in the vicinity of the danger zone, eliminates the risks of injury with a considerable degree of certainty.

According to the invention, this object is achieved in a safety device including a lever-like part, which is arranged between a guide part and an abutment and is connected to both a power-generating device and a movable part of a tool, and the guide part and the abutment interact with the lever-like part in a controlled manner, so that each working stroke of the movable part is effected in two stages, first of all as a motion stroke into a predetermined position and then as a power stroke for carrying out the actual metal-forming operation, which is only effected when there is no obstacle in the intermediate space between movable part and workpiece.

The safety device according to the present invention achieves a situation in which those metal-forming operations which require the use of both hands for the respective operation can also be carried out just as safely and just as free from accidents as, for example, those operations in which accident protection is effected by two-hand control.

The safety device only intervenes in the direct working sequence if a foreign body is located in the working region. In this case, the metal-forming operation is interrupted during the motion stroke, and the movable part of the tool arrangement returns into its initial position. Subsequently, the operation can easily be restarted. Neither is the operator of the machine in danger of having an accident nor is there the risk of damage to or destruction of machine parts or workpieces. The safety device ensures quick and simple operation of the machine even after interruption of the operation as a result of the safety device coming into effect.

Maximum pressure force only takes effect when it is actually required for the metal-forming operation and not over the entire distance which the movable part has to cover in order to carry out the metal-forming operation.

In a preferred embodiment of the invention, the lever-like part is designed in such a way that it serves at the same time to transmit power when the power stroke is initiated.

The lever-like part is thus both a functional element of the safety device and a functional element of the press machine per se. As a result, the design of the machine is simplified.

Due to the arrangement of the lever-like part, the piston rod and movable part perform the same vertical motion during the motion stroke, whereas the movable part performs a substantially smaller vertical motion compared with the piston-rod-side end of the lever-like part when the power stroke is being executed. As a result, the pressure force increases substantially during the press operation.

In a further advantageous embodiment of the safety device, the power-generating device is preferably designed as a pneumatic device, to a piston rod of which the lever-like part is rotatably connected. In this case, one side wall of a machine housing is designed as guide part and an abutment is arranged on an opposite side wall.

In particular for reasons of cost, the use of pneumatic power-generating devices is advantageous. However, hydraulic or electric devices may be used as well.

If the lever-like part of the safety device is rotatably connected to the piston rod of the pneumatic cylinder, this ensures that the lever-like part, in the normal case, that is at least during the motion stroke, performs the same motions in the vertical direction as the piston rod. In the process, it slides with a piston-rod-side end sliding along a guide surface of the guide part, while the other end of the lever-like part is carried along without coming into contact with the abutment.

In a preferred embodiment, the abutment is fastened in the housing in such a way as to be vertically displaceable and is provided with a tooth system over a section and with a groove-shaped recess located below the tooth system.

In this case, the position of the abutment in the housing interior depends on how large the distance is between movable part and fixed part of the tool before the power stroke is initiated.

According to the invention, the motion stroke is first completed owing to the fact that the lever-like part, by sliding into the groove-shaped recess in the abutment and sitting on a roller-like element of the movable part, has reached an end position in a first stage of the working stroke.

Owing to the fact that the abutment is arranged so as to be displaceable in the housing, the exact position of the abutment, in particular with regard to the distance of the top end of the groove-shaped recess from the workpiece height, may be set accurately at any time, since this position is important for the functioning of the press machine.

The motion stroke must be completed the instant the movable part reaches its predetermined position relative to the fixed part or the workpiece. This takes place by the lever-like part plunging into the groove-shaped recess and sitting on the roller-like element of the movable part, so that the roller-like element acts as an abutment relative to a stop which is formed by the top end of the elongated groove.

When workpieces of different size are used, it is therefore necessary to accurately adjust the position of the abutment relative to the workpiece.

The tooth system of the abutment is inoperative during a normal working sequence, that is if there is no obstacle in the working region.

In a preferred development of the solution according to the invention, the movable part sits on the workpiece in the end position of the motion stroke and before the power stroke is initiated.

This ensures that, before the power stroke is initiated, that is before the actual metal-forming operation is initiated, the distance between both tool parts is as small as possible, so that there can be no foreign body in the working region. The maximum requisite distance between the movable part and the fixed part before the power stroke is initiated is therefore predetermined only by the workpiece height.

In a further development of the invention, a tooth system is formed on that end of the lever-like part which projects towards the abutment, with which tooth system the lever-like part meshes with the tooth system of the abutment and jams between abutment and guide part if the end position of the motion stroke is not reached as a result of an obstacle in the working region of the tool.

The motion stroke is already interrupted before reaching its end position, so that initiation of the power stroke is reliably prevented.

It is of advantage if the lever-like part and the movable part are connected to one another in a spring-loaded manner.

The motion stroke is interrupted as soon as the teeth of the lever-like part begin to mesh with the tooth system of the abutment. The fastening of both parts to one another in a spring-loaded manner prevents the further downward motion of the piston rod from being transmitted to the obstacle, since the vertical distance is absorbed by the spring element from the start of the mutual meshing of the teeth up to the full intermeshing. The jamming of the lever-like part between the guide part and the abutment is not effected until full intermeshing of the tooth system has taken place.

The locking of the initiated working stroke is assisted owing to the fact that the internal distance between the guide parts in the region of the tooth system is less than the length of the lever-like part.

Despite further flow of compressed air into the pneumatic cylinder, the piston rod is prevented from moving further downwards by the jamming of the lever-like part. The control ensures that the air direction reverses. The result of this is that the piston rod and with it the lever-like part and the movable part of the tool move back again into the initial position. The power stroke is not initiated.

In another advantageous refinement of the safety device according to the invention, a release part is fastened to the piston-rod-side end of the lever-like part, which release part, in the end position of the motion stroke, interacts with an arrangement for initiating the power stroke.

That is to say, it is ensured that the power stroke is initiated and the metal-forming operation carried out only when the end position of the motion stroke has been reached.

There is a simple and cost-effective embodiment if the arrangement for initiating the power stroke consists of an inductive proximity sensor, which is arranged in the housing in such a way that it interacts with the release part only when the lever-like part has plunged into the groove-shaped recess in the abutment.

The motion stroke is completed and the power stroke initiated when the lever-like part plunges into the groove-shaped recess. The release part is at the proximity sensor. This takes place owing to the fact that the compressed-air feed in the cylinder is not interrupted and the piston rod, despite completion of the motion stroke of the movable part, can still move vertically downwards slightly, so that the release part reaches the proximity sensor, which signals initiation of the power stroke to the control.

A pressure sensor, which interacts with the inductive proximity sensor via a controller, is arranged in order to monitor a build-up of compressed air in the pneumatic cylinder.

This ensures in a technically simple manner that only the working pressure which is also actually required is built up in the pneumatic cylinder.

An advantageous embodiment ensures that the compressed-air cylinder, due to the arrangement of the pressure sensor, requires only about 50% of the available working pressure for the motion stroke and does not provide the full working pressure until the power stroke is initiated.

The device according to the invention ensures that, if there is an obstacle in the immediate working region of the metal-forming tool, the initiated working stroke is stopped during the motion stroke and the movable part and the lever-like part are returned into the initial position. After removal of the foreign body from the immediate working region of the tool, the metal-forming operation can be repeated by actuating the foot switch.

Accidents due to inattentiveness are thus completely ruled out.

BRIEF DESCRIPTION OF THE DRAWINGS

The invention is to be explained in more detail below with reference to a crimping machine for connecting electric cables to plug-in connectors. In the associated drawing.

DETAILED DESCRIPTION

Figure 1:
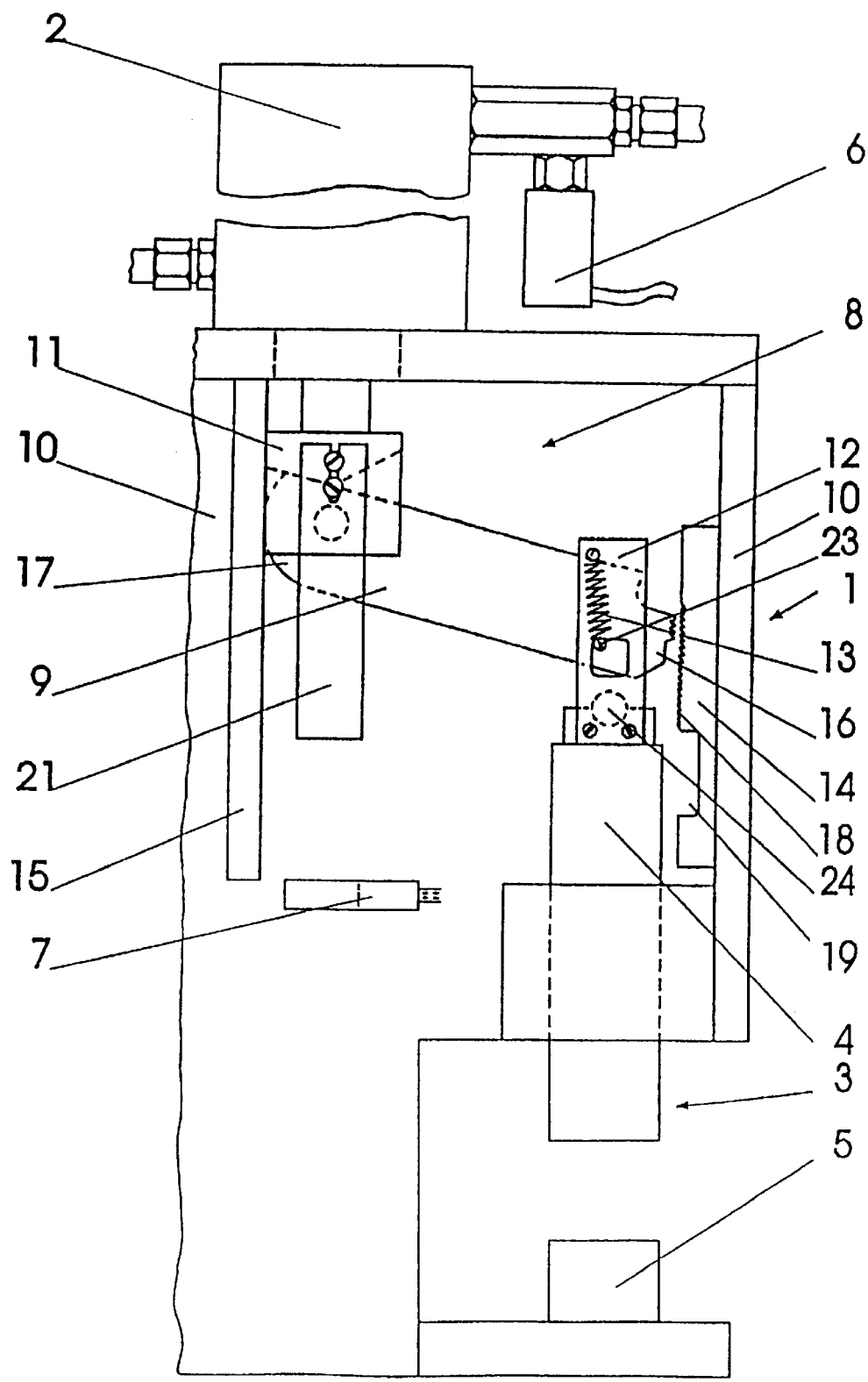
FIG. 1 shows a diagrammatic sectional representation of a crimping machine in side view and with the machine in a rest position.

According to FIG. 1, a crimping machine comprises a housing 1, the power-generating device in the form of a compressed-air cylinder 2, a control device (not shown in the drawing), and a tool arrangement 3, consisting of a top movable part 4, a bottom fixed part 5 and an actual crimping tool (also not indicated in the drawing) connected thereto. The workpiece (not shown in the drawing) is placed in position or inserted in that part of the crimping tool which is arranged on the fixed part 5. Furthermore, the crimping machine has a pressure sensor 6 for monitoring a working pressure in the compressed-air cylinder 2, a sensor arrangement 7 and a safety device 8 according to the invention for preventing accidents at work due to improper operation of the machine.

The crimping machine is operated by a foot switch, which is likewise not shown in the drawing. Foot operation is necessary, since both hands are required in order to be able to carry out a crimping operation properly and safely. To this end, it is necessary for a plug-in connector to be held in place with one hand, while the other hand guides a connecting cable inserted into a crimp barrel and an interior of the plug-in connector. In the process, both hands are also located in the immediate vicinity of the working region when the crimping operation is being carried out, so that, if there is the slightest inattentiveness, there is the danger of one or more fingers being caught. There is therefore an increased accident risk, which can be obviated in a reliable manner by means of the safety device 8, which is arranged in the housing interior of the crimping machine.

The safety device 8 consists of a lever-like part 9, which in its initial position is arranged in a downwardly sloping manner between two opposite housing walls 10. In this case, it is rotatably connected on one side to the piston rod 11 of the pneumatic cylinder 2 and projects on another side up to the opposite housing wall 10. By means of a bolt-like part 23, which is connected to a top guide element 12 of the movable part 4 in a spring-loaded manner, the lever-like part 9 is fastened to the movable part 4, so that, given an appropriate design of a spring 13, the further motion stroke of the piston rod 11 up to full meshing of the tooth system 16, 18 can be absorbed in the event of danger such as an object blocking the movable part 4.

Figure 2:
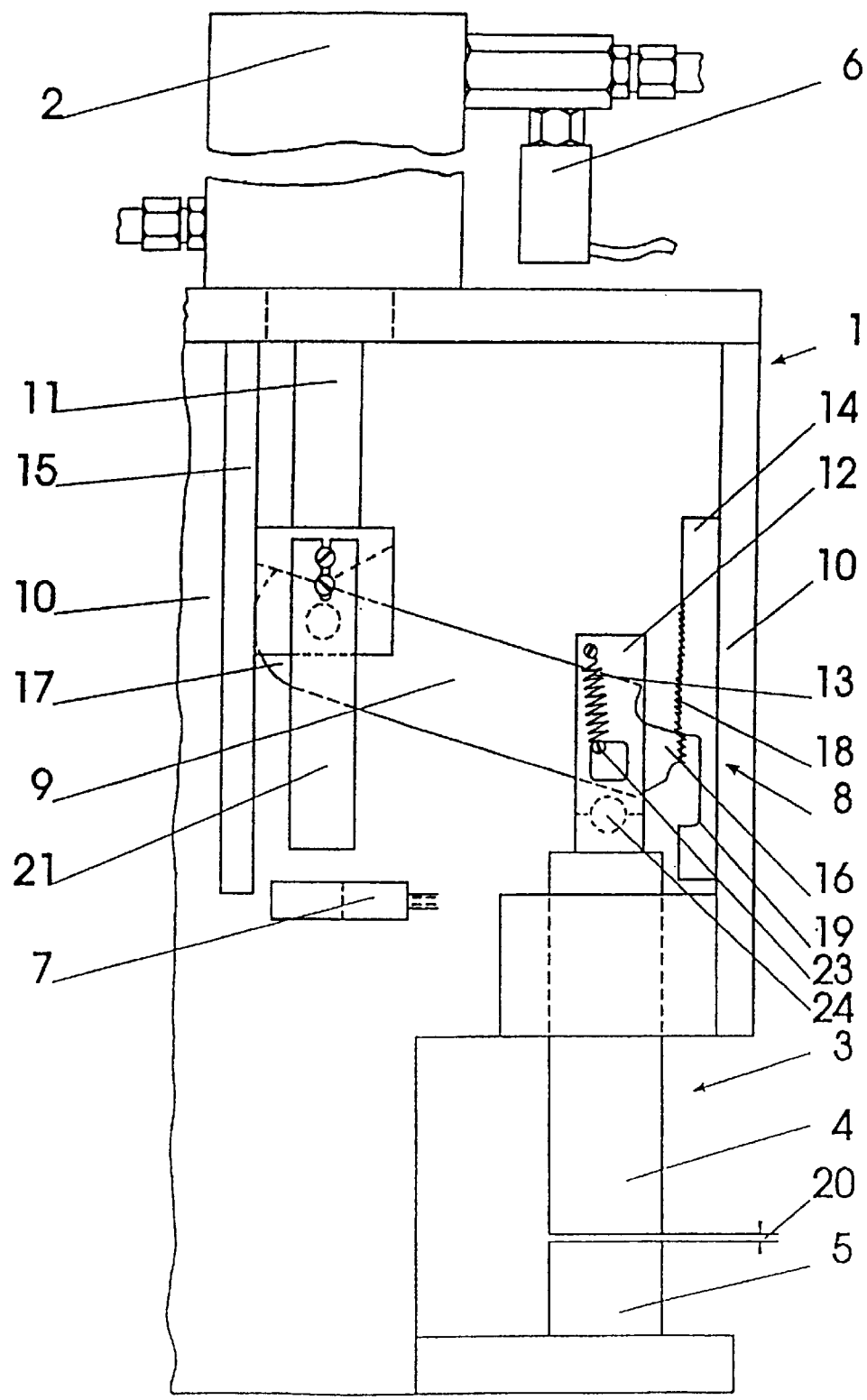
FIG. 2 shows the crimping machine according to FIG. 1 in a state in which a motion stroke is completed and before initiation of a power stroke.

Furthermore, the safety device 8 includes an abutment 14, arranged on an inner wall 10 of the housing, and a guide part 15 opposite the abutment 14. In this case, the abutment 14 is fastened to the inner wall 10 of the housing 1 in such a way that it can be set in an exact position. The exact position in this case, depends on a height of the crimp barrel or on the distance between movable part 4 and fixed part 5 after an end position 20, shown in FIG. 2, of the motion stroke is reached. In order to keep this distance as small as possible, the motion stroke is set in such a way that the movable part 4 sits on the crimp barrel at the end position of the motion stroke.

A guide part 15 is of such a size and is designed in such a way that the lever-like part 9 slides with one end 17 along an inner surface of the guide part 15 or, in the event of danger, becomes jammed between guide part 15 and abutment 14. To this end, the distance between abutment 14 and guide part 15 is selected in such a way that the lever-like part 9 can only jam in the housing part in which the abutment 14 is provided with a tooth system 18. This takes place whenever the motion stroke is interrupted as a result of the presence of a foreign body 25 in the crimping region.

The end 16 of the lever-like part 9 which points towards the abutment 14 is likewise of toothed design. However, both tooth systems 16, 18 only intermesh if an obstacle 25 is located in the working region of the tool 3.

Figure 3:
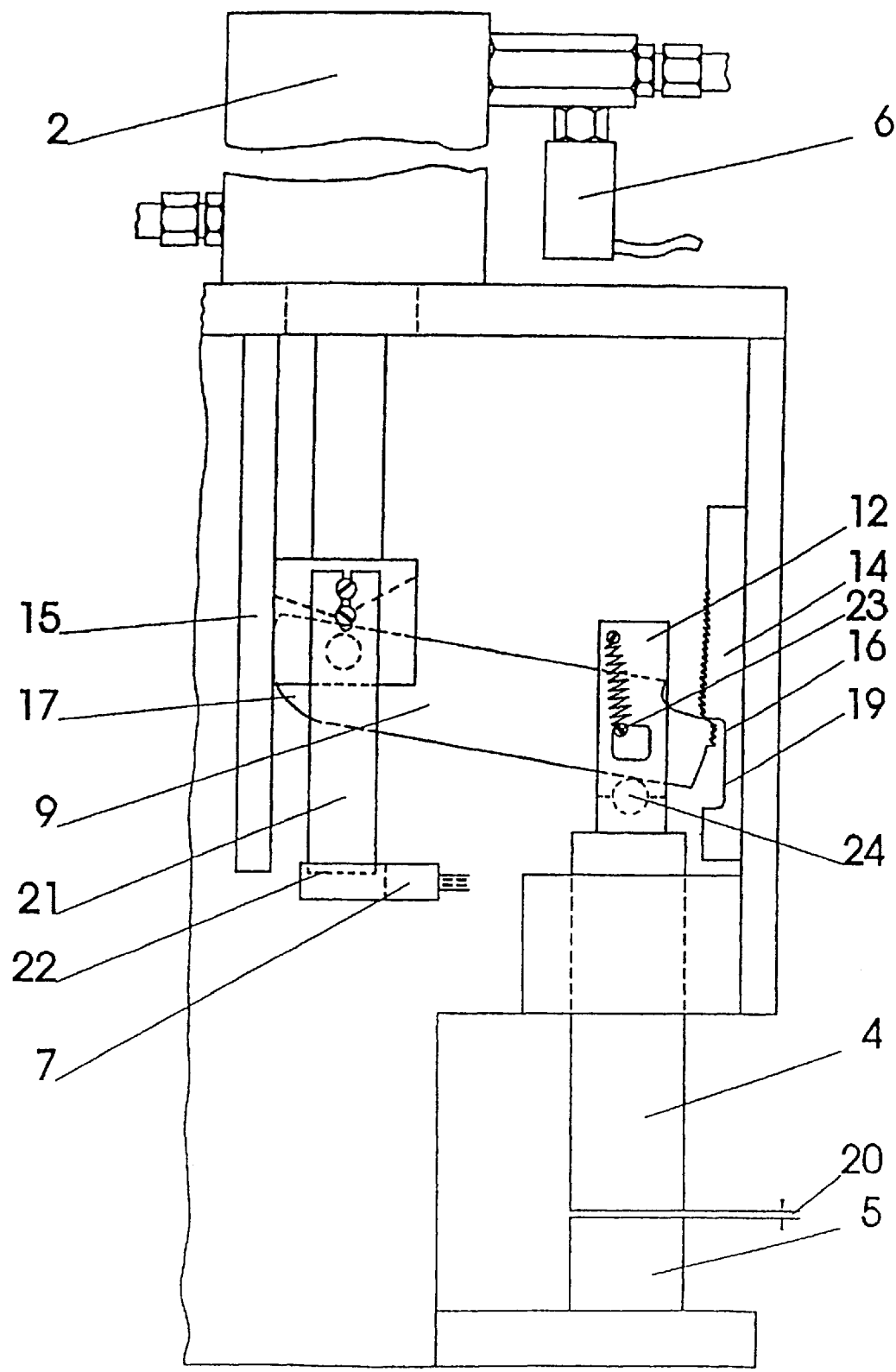
FIG. 3 shows the crimping machine according to FIG. 1 in a state in which a proximity sensor is just activated while a power stroke is initiated.

In the bottom part of the abutment 14, the tooth system 18 extends to a groove-shaped recess in the form of an elongated groove 19, the exact position of which depends on the height of the crimp barrel or on the end position 20 of the motion stroke, for this position is reached when the lever-like part 9 has plunged into the elongated groove 19. The groove depth is therefore adapted to the length of the lever-like part 9. At the end position 20 of the motion stroke, the lever-like part 9 rests on a roller-like element 24 of the movable part 4, as shown in FIG. 3, so that the roller-like element 24 serves as an abutment relative to a top end of the elongated groove 19, against which the lever-like part 9 likewise bears.

The end 17 of the lever-like part 9 is firmly connected to the piston rod 11 of the pneumatic cylinder 2 and slides—in accordance with the motion of the piston rod 11—along the inner surface of the guide part 15 and is of curved design in order to be able to realize all the possible angled positions with regard to the axis of the lever-like part 9. In the process, the lever-like part 9 only reaches an approximately horizontal position when the power stroke is initiated and the movable part 4 sits on the fixed part 5 (see FIG. 4).

Arranged on the piston-rod-side end 17 of the lever-like part 9 and/or on the piston rod 11 itself is a release part 21, which, in the absolute end position 20 of the motion stroke, engages in an aperture 22, formed in an inductive proximity sensor 7, and thus signals to the control device that the power stroke can be initiated.

The mode of operation of the safety device 8 is as follows:

In the initial position, shown in FIG. 1, the lever-like part 9, according to FIG. 1, is located in a top region of the housing 1 of the crimping machine. In this case, the teeth of the toothed end 16 of the lever-like part 9 do not mesh with the tooth system 18 of the abutment 14, and the piston rod 11 is likewise located in the initial position.

When the foot switch is actuated, a pressure which at most corresponds to half the working pressure is built up in the compressed-air cylinder 2. The piston rod 11 moves downwards with this minimum force. With movement of the piston rod 11, the movable part 4 and the lever-like part 9 are guided downwards (FIG. 2) along the guide surface 15 until the toothed end 16 of the lever-like part 9 plunges into the elongated groove 19 of the abutment 14 and sits on the roller-like element 24 of the movable part 4. The end position of the motion stroke has now been reached and the movable part 4 is located directly on the workpiece—the plug-in connector prepared for the crimping operation and having an inserted cable, which the operator of the machine has to guide with both hands.

Just after the end position of the motion stroke is reached, the release part 21, as a result of the further vertical motion of the piston rod 11, plunges into the aperture 22 of the inductive proximity sensor 7 as shown in FIG. 3, and thus emits the signal "initiate power stroke".

Figure 4:
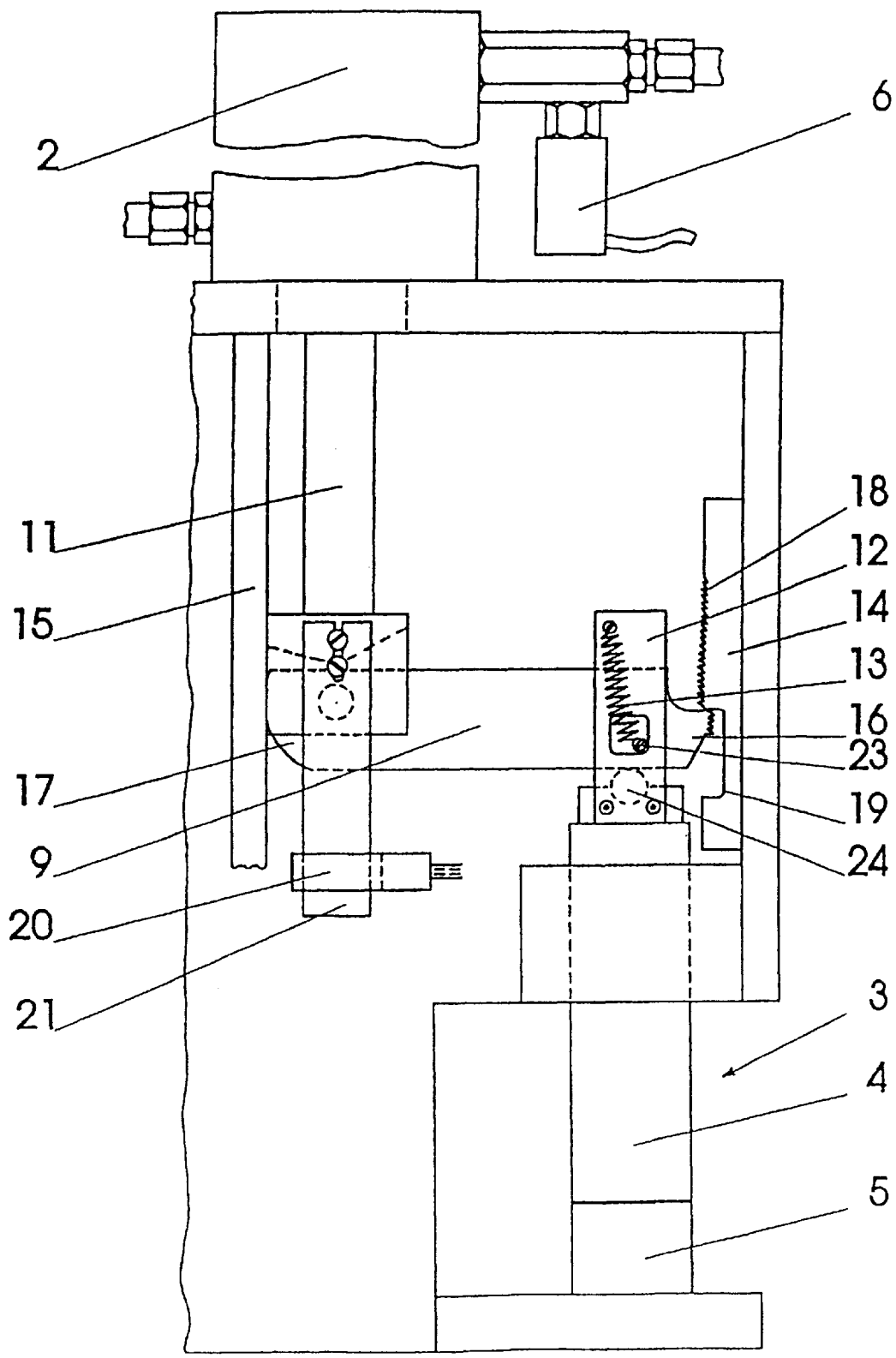
FIG. 4 shows the crimping machine according to FIG. 1 at an end position, that is after the crimping operation is carried out.

FIG. 3 illustrates the state of the end position of the lever-like part 9 upon reaching the absolute end position 20 of the motion stroke. FIG. 4 shows the position of the lever-like part 9 after the power stroke, with which the actual crimping operation is carried out, has been initiated. The movable part 4 of the tool arrangement 3 strikes the fixed part 5 of the tool arrangement 3 with a high pressure force (maximum working pressure) and presses the cable between crimp barrel and plug-in connector. The pressure force is additionally increased owing to the fact that the lever-like part 9 now serves to transmit the power and the piston rod 11 covers a substantially larger vertical distance than the movable part 4. After a short time, which may be interrupted by appropriate actuation of the foot lever, for example in the event of faulty crimping, the piston rod 11 returns into its initial position, and with it the movable part 4 and the lever-like part 9.

This operation may be repeated continually; it is only interrupted if a foreign object is located directly in the crimping region. The operation may of course also be interrupted by non-actuation of the foot switch.

Figure 5:
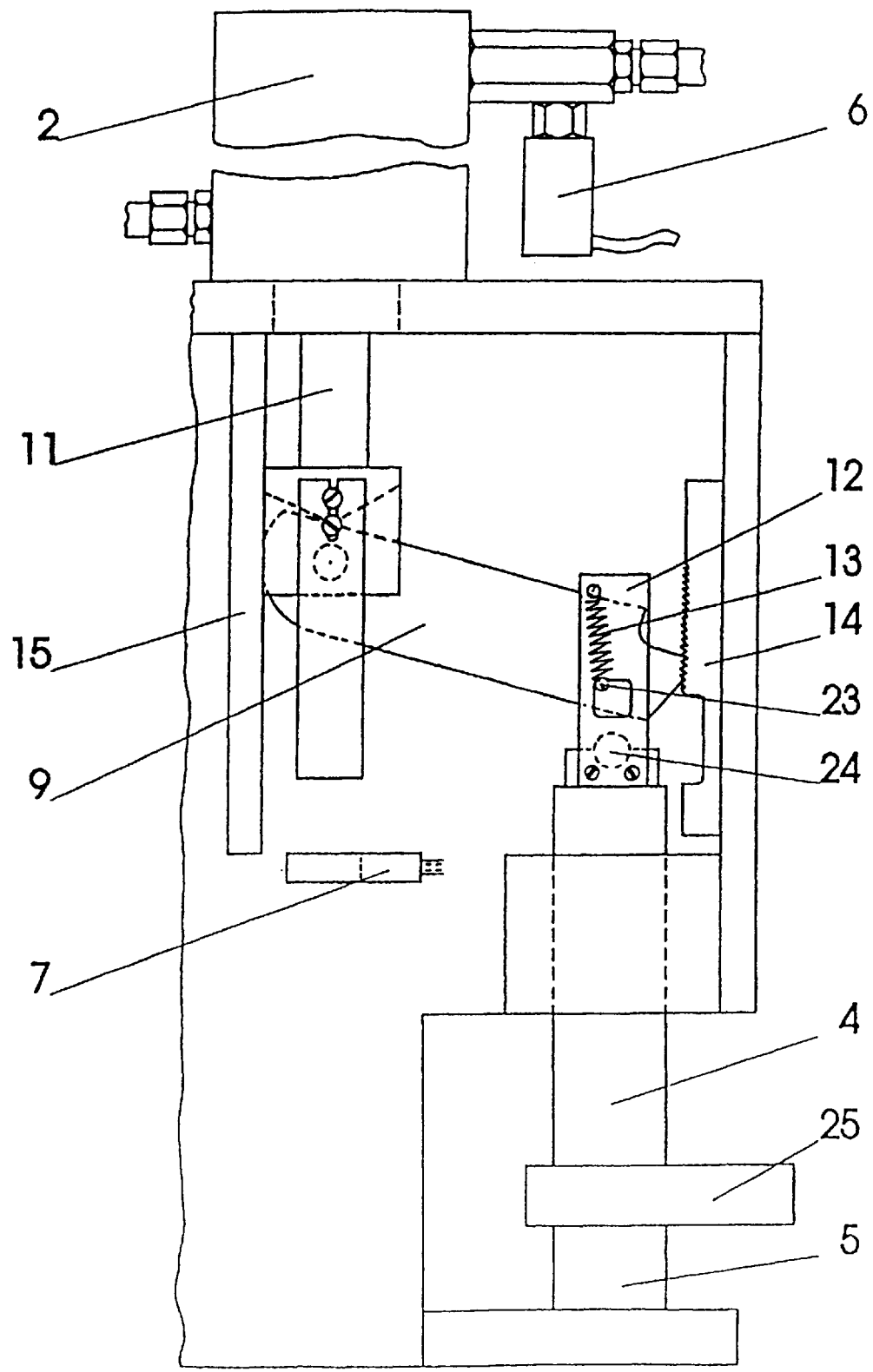
FIG. 5 shows the crimping machine according to FIG. 1 with a foreign body present in an immediate working region.

FIG. 5 illustrates the state in which the safety device 8 has come into effect. In this case, the movable part 4 does not reach the end position 20 of the motion stroke. If, for example, the operator of the machine has not been able to remove his fingers from the crimping region in good time, the movable part 4 does strike his fingers. At this instant, the tooth system 16, 18 comes into effect; that is, the tooth system 16 of the lever-like part 9 is pressed into the tooth system 18 of the abutment 14. The motion stroke is interrupted right at the start of this action. The spring-loaded fastening of the movable part 4 prevents the further motion stroke of the piston rod 11 from being transmitted to the fingers, since the full meshing of the teeth 16, 18, which would cause a further, if only small, vertical motion of the movable part 4, is absorbed by a spring 13. At worst, therefore, the movable part 4 strikes the obstacle 25 with the force of the dead weight of the movable part 4 and the tensile force of the spring. Even slight injuries are prevented owing to the fact that the tensile force of the spring 13 is proportioned in such a way that it is greater than the force due to the weight of the movable part 4. The pressure force which acts on the foreign body 25 in the process is therefore the sum of the force due to the weight of the movable part 4 and the tensile force of the spring 13.

At the same time as the teeth 16 of the lever-like part 9 mesh with those of the abutment 14, the piston rod 11 of the pneumatic cylinder 2, at the other end 17 of the lever-like part 9, presses the lever-like part 9 downwards or holds it in position. The lever-like part 9 jams between abutment 14 and guide part 15, the piston rod 11 is thus unable to perform any further motion, and the press operation is interrupted.

However, since compressed air continues to be fed to the pneumatic cylinder 2, a pressure increase, which is monitored by the pressure sensor 6, takes place. The air direction in the pneumatic cylinder 2 is now reversed by the control device. As a result, the piston rod 11 is moved upwards again, and the lever-like part 9, which can move back into the initial position together with the movable part 4, is unlocked. The crimping operation may then be repeated by renewed actuation of the foot switch.

Safety Device on Metal-Forming Machines

List of Designations

1 Housing
2 Pneumatic device
3 Tool arrangement
4 Movable part
5 Fixed part
6 Pressure sensor
7 Sensor arrangement
8 Safety device
9 Lever-like part
10 Housing wall
11 Piston rod
12 Guide element
13 Spring
14 Abutment
15 Guide part
16 Toothed end of the lever-like part
17 Piston-rod-side end of the lever-like part
18 Tooth system
19 Elongated groove
20 End position of the motion stroke
21 Release part
22 Aperture
23 Bolt-like element
24 Roller-like element
25 Obstacle

What is claimed is:

1. A safety device for press machines including a machine housing, a power-generating device for imparting motion to a force member which moves along a first travel path starting at an initial position, the safety device comprising:

a pressing part having a tool portion for accepting a forming tool, said pressing part being slidably mounted in said machine housing so as to be movable along a second travel path;

a guide member disposed parallel said first travel path;

an abutment member disposed parallel said second travel path and having a first surface portion parallel said guide member and disposed a first distance from said guide member;

a lever part disposed between said guide member and said abutment member and having a first lever end and a second lever end disposed apart a second distance greater than said first distance, and an engagement surface proximate said second lever end;

said lever part having a movable connection to said pressing part such that said second lever end is contactable with said first surface portion of said abutment member;

said lever part having a movable connection to said force member such that said first lever end is contactable along said guide member;

said lever part having said movable connections to said pressing part and said force member such that said force member and said lever part supports a weight of said pressing part when said lever part extends from said force member at a first angle so that up and down movement of said force member allows up and down movement of said pressing part, wherein downward force of said pressing part is substantially limited to the weight of said pressing part, and interruption of the downward movement of the pressing part by an object, in combination with continued downward movement of said force member, before said pressing part reaches a predetermined position, displaces said lever part from said first angle orientation relative to said force member to move said first lever end and said second lever end respectively into contact said guide member and said abutment member to jam said lever part therebetween thereby preventing further movement of said pressing part; and said abutment member having a second surface portion below said first surface portion and said abutment member being disposed such that, when said pressing part is move to said predetermined position, said second lever end is below said first surface portion and interruption of downward motion of the pressing part by a workpiece in combination with continued downward travel of said force member displaces into said engagement surface of said lever part into pivotal contact with said second surface portion of said abutment member to effect a pivot action whereby said lever part transmits force of said downwardly traveling force member to downwardly displace said pressing part to press said workpiece.

2. A safety device according to claim 1 wherein:

said movable connection of said lever part to said force member is a rotatable connection;

said guide member is a first side wall of the machine housing; and said abutment member is disposed on a second side wall of the machine housing opposing said first side wall.

3. A safety device according to claim 1 wherein:

said abutment member is fastened in the machine housing vertically displaceable permitting adjustment of a fixable position of said abutment member;

said first surface portion of said abutment member is provided with teeth; and said second lever end is provided with teeth for engaging said teeth of said first surface portion.

4. A safety device according to claim 1 wherein:

said abutment member defines a recess groove having said second surface as a wall thereof; and said pressing part has a roller bearing upon which said lever part bears during said pivot action thereof.

5. A safety device according to claim 1 wherein said abutment member is disposed such that the forming tool rests on the workpiece when said pressing member is at said predetermined position.

6. A safety device according to claim 1 wherein said movable connection of said lever part and said pressing part includes a biasing device such that said downward force of said pressing member prior to arrival at said predetermined position includes a bias force of said biasing device.

7. A safety device according to claim 1 further comprising:

said force member having a release detection portion;

a detector for detecting said release detection portion when said force member is at said predetermined position; and a controller for permitting increased force of said force member in response to said detector detecting said release detection portion.

8. A safety device according to claim 7, wherein said detector is an inductive proximity sensor.

9. A safety device according to claim 7 further comprising:

a pressure sensor for sensing a pressure exerted on said force member; and said controller including means for monitoring said pressure sensor and controlling said pressure in response to said detector.

10. A safety device according to claim 9 wherein said controller includes means for limiting said pressure to about 50% of available working pressure prior to said pressing member arriving at said predetermined position and allowing full working pressure once said pressing member arrives at said predetermined position.

11. A safety device according to claim 1 further comprising means for returning said force member to said initial position after said lever part is jammed.

12. A press machine including a machine housing, a power-generating device for imparting substantially vertical motion to a force member which moves from a force member initial position along a first travel path, the press machine comprising:

a pressing member having a tool portion for accepting a forming tool for forming a workpiece, said pressing member being slidably mounted in said machine housing so as to be substantially vertically movable along a second travel path through a work stroke including:

a motion stroke extending from a pressing member initial position down to a predetermined position whereat the forming tool is situated at the workpiece; and a power stroke extending from said predetermined position down to a final position whereat said workpiece is formed;

a lever member having first and second lever ends, first and second lever end portions respectively including said first and second ends, and an intermediate portion between said first and second lever end portions;

said intermediate portion being moveably connected to said pressing member so as to vertically support said pressing member;

said first lever end portion being moveably connected to said force member so as to rest at a rest position, relative said force member, extended from said force member at a downward incline and be freely pivotable in an upwards direction relative said force member from said rest position such that said force member and said lever member are deflectable upwards relative said force member when encountering an obstruction imparting sufficient force to overcome weight of said lever member, said pressing member and said forming tool during downward movement of said force member effecting said motion stroke; and a pivot engagement surface adjustably disposed in said machine housing at a position aligned with said second lever end portion of said lever member when said pressing member is at said predetermined position with said forming tool at the workpiece such that further downward motion of said force member results in upward deflection of said lever member relative to said force member and said second lever end portion of said lever member being displaced into pivotal engagement with said pivot engagement surface whereby said lever member imparts force to said pressing member at said moveable connection during further downward motion of said force member until said pressing member is at said final position.

13. The press machine of claim 12 further comprising:

a guide member disposed parallel said first travel path opposing said first lever end of said lever member;

an abutment member disposed parallel said second travel path and having an abutment surface portion parallel said guide member and disposed a first distance from said guide member such that said second lever end of said lever member is opposing said abutment surface portion;

said lever member having said first lever end and said second lever end disposed apart a second distance greater than said first distance, and an engagement surface at said second lever end;

said moveable connection of said lever member to said force member effecting slidable engagement of said first lever end along said guide member; and said movable connection of said lever member to said pressing member permitting displacement of said second lever end into engagement with said engagement surface portion of said abutment member such that said lever member is jammed between said guide member and said abutment member during said motion stroke when said pressing member encounters an obstruction imparting sufficient force to overcome the weight of said lever member, said pressing member and the forming tool during downward movement of said force member thereby deflecting the lever member upwards relative to said force member placing said first and second lever ends into respective engagement with said guide member and said abutment member.

14. The press machine according to claim 13, wherein said movable connection of said lever member to said force member is a rotatable pivot connection.

15. The press machine according to claim 13, wherein said guide member is a first side wall of the machine housing and said abutment member is disposed on a second side wall of the machine housing opposing said first side wall.

16. The press machine according to claim 13 wherein said abutment member is fastened in the machine housing vertically displaceable permitting adjustment of a fixable position of said abutment member.

17. The press machine according to claim 13 wherein:
said abutment surface portion of said abutment member is provided with teeth; and
said second lever end is provided with teeth for engaging said teeth of said abutment surface portion.

18. The press machine according to claim 13 wherein said abutment member defines a recess groove having said pivot engagement surface as a wall thereof.

19. The press machine according to claim 13 wherein said pressing member has a roller bearing at said moveable connection with said lever member upon which said lever member bears during said power stroke.

20. The press machine according to claim 19 wherein said movable connection of said lever member and said pressing member includes a biasing device such that downward force of said pressing member prior to arrival at said predetermined position includes a bias force of said biasing device.

21. The press machine according to claim 13 wherein said movable connection of said lever member and said pressing member includes a biasing device such that downward force of said pressing member prior to arrival at said predetermined position includes a bias force of said biasing device.

22. The press machine according to claim 12 wherein said pressing member has a roller bearing at said moveable connection with said lever member upon which said lever member bears during said power stroke.

23. The press machine according to claim 22 wherein said movable connection of said lever member and said pressing member includes a biasing device such that downward force of said pressing member prior to arrival at said predetermined position includes a bias force of said biasing device.

24. The press machine according to claim 12 wherein said movable connection of said lever member and said pressing member includes a biasing device such that downward force of said pressing member prior to arrival at said predetermined position includes a bias force of said biasing device.

25. The press machine according to claim 12 further comprising:

said force member having a release detection portion;

a detector for detecting said release detection portion when said force member is at said predetermined position; and a controller for permitting increased force of said force member in response to said detector detecting said release detection portion.

26. The press machine according to claim 25 farther comprising;

a pressure sensor for sensing a pressure exerted on said force member; and said controller including means for monitoring said pressure sensor and controlling said pressure in response to said detector.

27. The press machine according to claim 26 wherein said controller includes means for limiting said pressure to about 50% of available working pressure prior to said pressing member arriving at said predetermined position and allowing full working pressure once said pressing member arrives at said predetermined position.

28. The press machine according to claim 13 further comprising means for returning said force member to said force member initial position after said lever member is jammed.

29. A press safety mechanism for advancing a forming tool to a workpiece in a press machine which includes a machine housing, a power-generating device for imparting substantially vertical motion to a force member which moves from a force member initial position along a first travel path, the press machine comprising:

a pressing member having a tool portion for accepting the forming tool for forming a work piece, said pressing member being slidably mounted in said machine housing so as to be substantially vertically movable along a second travel path through a work stroke including a motion stroke extending from an initial pressing member position down to a predetermined position whereat the forming tool is situated at the workpiece;

a lever member having first and second lever ends, first and second lever end portions respectively including said first and second ends, and an intermediate portion between said first and second lever end portions;

said intermediate portion being moveably connected to said pressing member so as to vertically support said pressing member; and said first lever end portion being moveably connected to said force member so as to rest at a rest position, relative said force member, extended from said force member at a downward incline and be freely pivotable in an upwards direction relative said force member from said rest position such that said force member and said lever member are deflectable upwards relative said force member when encountering an obstruction imparting sufficient force to overcome weight of said lever member, said pressing member and the forming tool during downward movement of said force member effecting said motion stroke.

30. The press safety mechanism according to claim 29 further comprising means for applying pressing force to said pressing member enabled by said pressing member arriving at said predetermined position to advance said pressing member through a power stroke extending from said predetermined position down to a final position whereat said workpiece is formed.

31. The press safety mechanism according to claim 30 wherein said means for applying pressing force includes an engagement device adjustably disposed in said machine housing at a position aligned with said second lever end portion of said lever member, when said pressing member is at said predetermined position with said forming tool at the workpiece, to arrest upward movement of said second lever end portion whereby said lever member imparts force to said pressing member at said moveable connection during further downward motion of said force member until said pressing member is at said final position.

32. The press safety mechanism according to claim 31 wherein said engagement device includes a pivot engagement surface facing at least partially in a downward direction and adjustably disposed in said machine housing at a position aligned with said second lever end portion of said lever member when said pressing member is at said predetermined position such that further downward motion of said force member results in upward deflection of said lever member relative to said force member and said second lever end portion of said lever member being laterally displaced into pivotal engagement with said pivot engagement surface whereby said lever member imparts force to said pressing member at said moveable connection during further downward motion of said force member until said pressing member is at said final position.

33. The press safety mechanism of claim 29 further comprising:
  a guide member disposed parallel said first travel path opposing said first lever end of said lever member;
  an abutment member disposed parallel said second travel path and having an abutment surface portion parallel said guide member and disposed a first distance from said guide member such that said second lever end of said lever member is opposing said abutment surface portion;
  said lever member having said first lever end and said second lever end disposed apart a second distance greater than said first distance, and an engagement surface at said second lever end:
  said moveable connection of said lever member to said force member effecting slidable engagement of said first lever end along said guide member; and
  said movable connection of said lever member to said pressing member permitting displacement of said second lever end into engagement with said engagement surface portion of said abutment member such that said lever member is jammed between said guide member and said abutment member during said motion stroke when said pressing member encounters an obstruction imparting sufficient force to overcome the weight of said lever member, said pressing member and the forming tool during downward movement of said force member thereby deflecting the lever member upwards relative to said force member placing said first and second lever ends into respective engagement with said guide member and said abutment member.

34. The press safety mechanism according to claim 33 further comprising means for applying pressing force to said pressing member enabled by said pressing member arriving at said predetermined position to advance said pressing member through a power stroke extending from said predetermined position down to a final position whereat said workpiece is formed.

35. The press safety mechanism according to claim 34 wherein said means for applying pressing force includes an engagement device adjustably disposed in said machine housing at a position aligned with said second lever end portion of said lever member, when said pressing member is at said predetermined position with said forming tool at the workpiece, to arrest upward movement of said second lever end portion whereby said lever member imparts force to said pressing member at said moveable connection during further downward motion of said force member until said pressing member is at said final position.

36. The press safety mechanism according to claim 35 wherein said engagement device includes a pivot engagement surface facing at least partially in a downward direction and adjustably disposed in said machine housing at a position aligned with said second lever end portion of said lever member when said pressing member is at said predetermined position such that further downward motion of said force member results in upward deflection of said lever member relative to said force member and said second lever end portion of said lever member being laterally displaced into pivotal engagement with said pivot engagement surface whereby said lever member imparts force to said pressing member at said moveable connection during further downward motion of said force member until said pressing member is at said final position.

37. The press safety mechanism according to claim 33 wherein:
  said abutment surface portion of said abutment member is provided with teeth; and
  said second lever end is provided with teeth for engaging said teeth of said abutment surface portion.

38. The press safety mechanism according to claim 35 further comprising:
  said force member having a release detection portion;
  a detector for detecting said release detection portion when said force member is at said predetermined position; and
  a controller for permitting increased force of said force member in response to said detector detecting said release detection portion.

39. The press safety mechanism according to claim 34 further comprising:
  a pressure sensor for sensing a pressure exerted on said force member; and
  said controller including means for monitoring said pressure sensor and controlling said pressure in response to said detector.

40. The press safety mechanism according to claim 34 wherein said controller includes means for limiting said pressure to about 50% of available working pressure prior to said pressing member arriving at said predetermined position and allowing full working pressure once said pressing member arrives at said predetermined position.

41. The press safety mechanism according to claim 33 further comprising means for returning said force member to said force member initial position after said lever member is jammed.

* * * * *